(No Model.) 3 Sheets—Sheet 1.

L. MALEN.
COFFEE URN.

No. 429,139. Patented June 3, 1890.

WITNESSES:
Gustave Dieterich
William Goebel

INVENTOR
Louis Malen
BY Briesen & Knauth
ATTORNEYS.

(No Model.) 3 Sheets—Sheet 2.

L. MALEN.
COFFEE URN.

No. 429,139. Patented June 3, 1890.

WITNESSES:
Gustave Dieterich
William Goebel.

INVENTOR
Louis Malen
BY Briesen & Knauth
ATTORNEYS.

(No Model.) 3 Sheets—Sheet 3.

L. MALEN.
COFFEE URN.

No. 429,139. Patented June 3, 1890.

WITNESSES:
Gustave Dieterich.
William Goebel.

INVENTOR
Louis Malen
BY Brieson & Knauth
ATTORNEYS.

UNITED STATES PATENT OFFICE.

LOUIS MALEN, OF PARIS, FRANCE.

COFFEE-URN.

SPECIFICATION forming part of Letters Patent No. 429,139, dated June 3, 1890.

Application filed March 1, 1890. Serial No. 342,250. (No model.)

*To all whom it may concern:*

Be it known that I, LOUIS MALEN, a citizen of the French Republic, residing in the city of Paris, France, have invented an Improvement in Coffee Pots and Urns, of which the following is a specification.

My invention relates to an improvement in coffee pots and urns; and its object is the economical production of coffee, which can be kept warm for a considerable length of time without deterioration.

My invention consists in the novel arrangement of parts of a coffee pot or urn, which will be more fully described in the subsequent portion of the specification, reference being had to the accompanying drawings, forming part of the same, in which—

Figure 1:
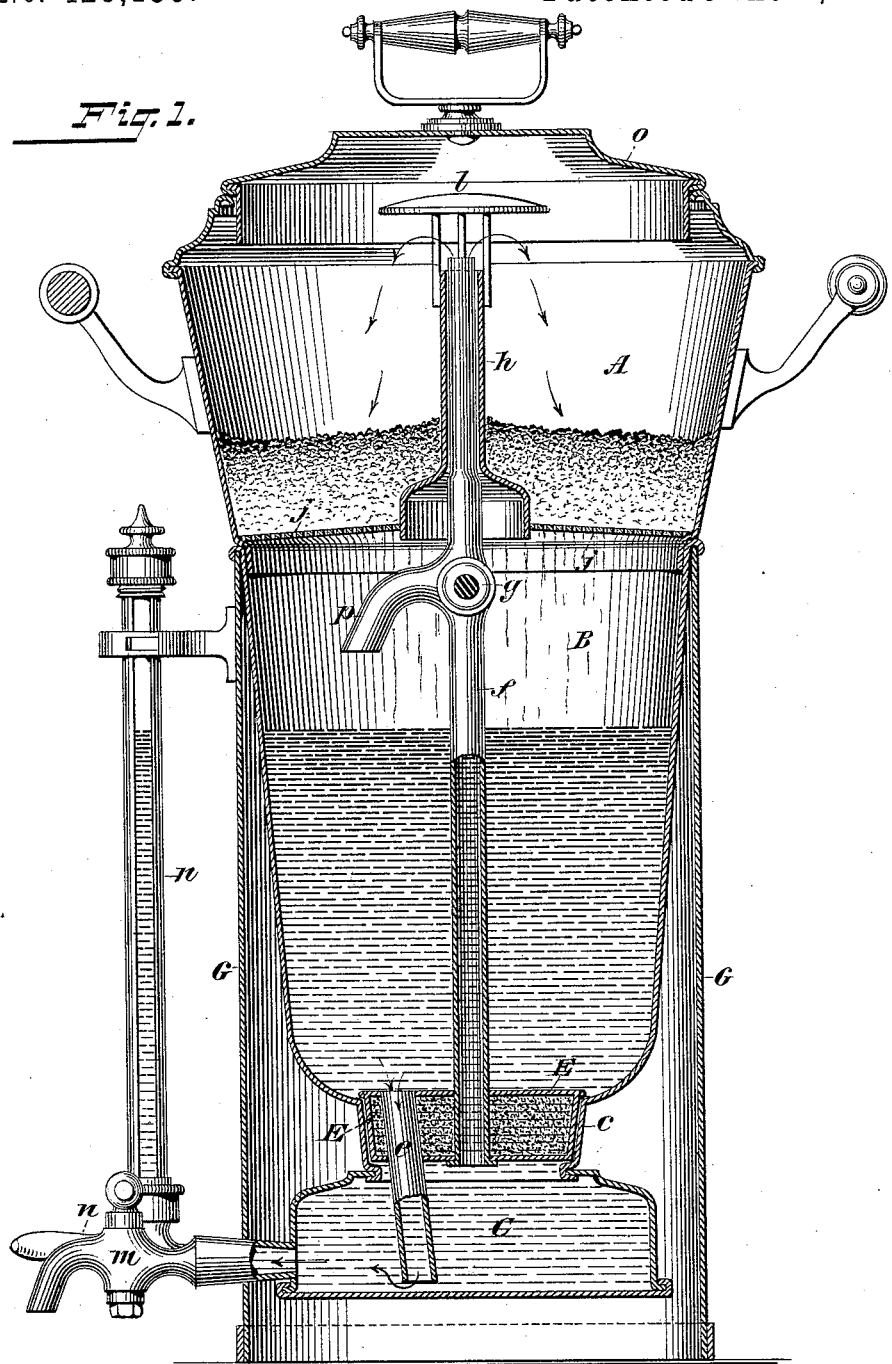
Figure 2:
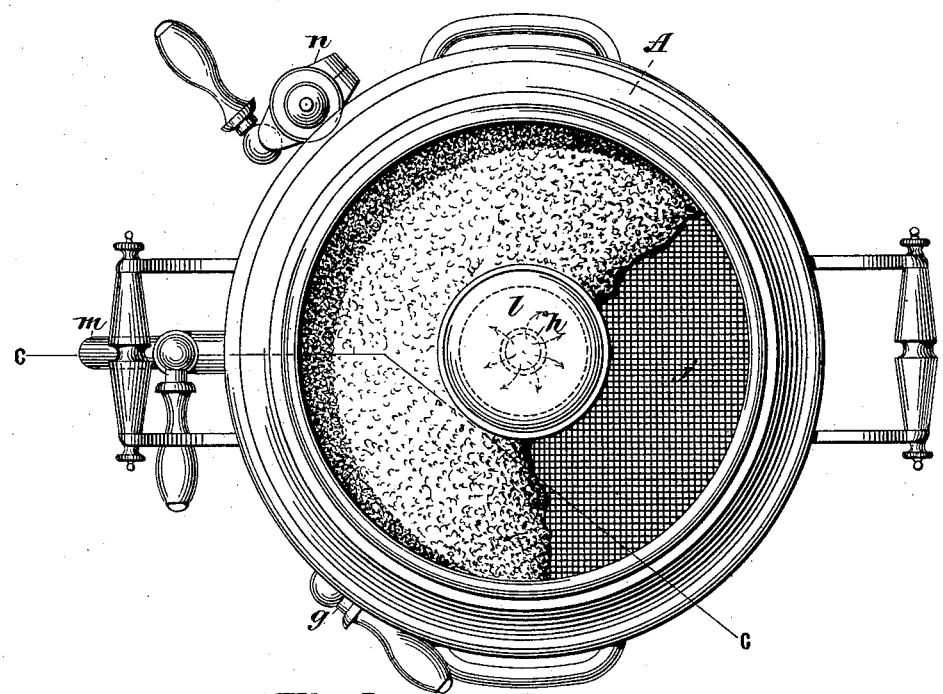
Figure 3:
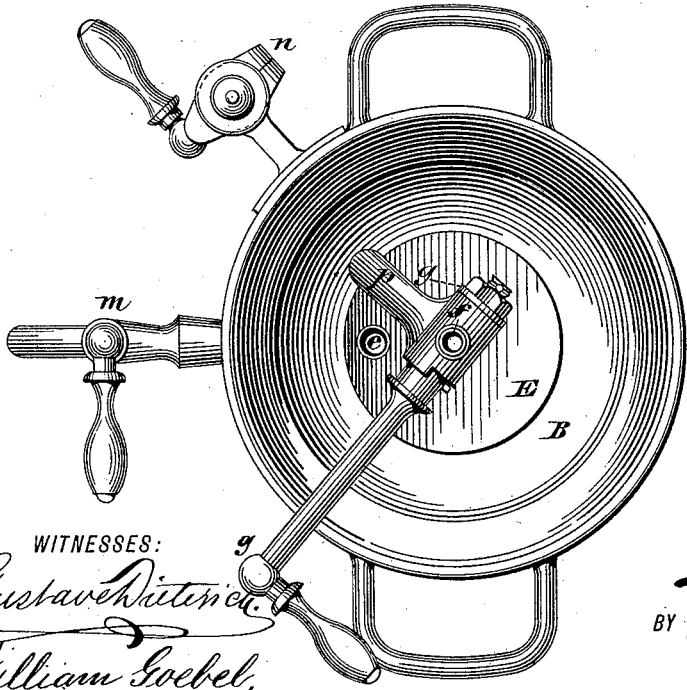
Figure 5:
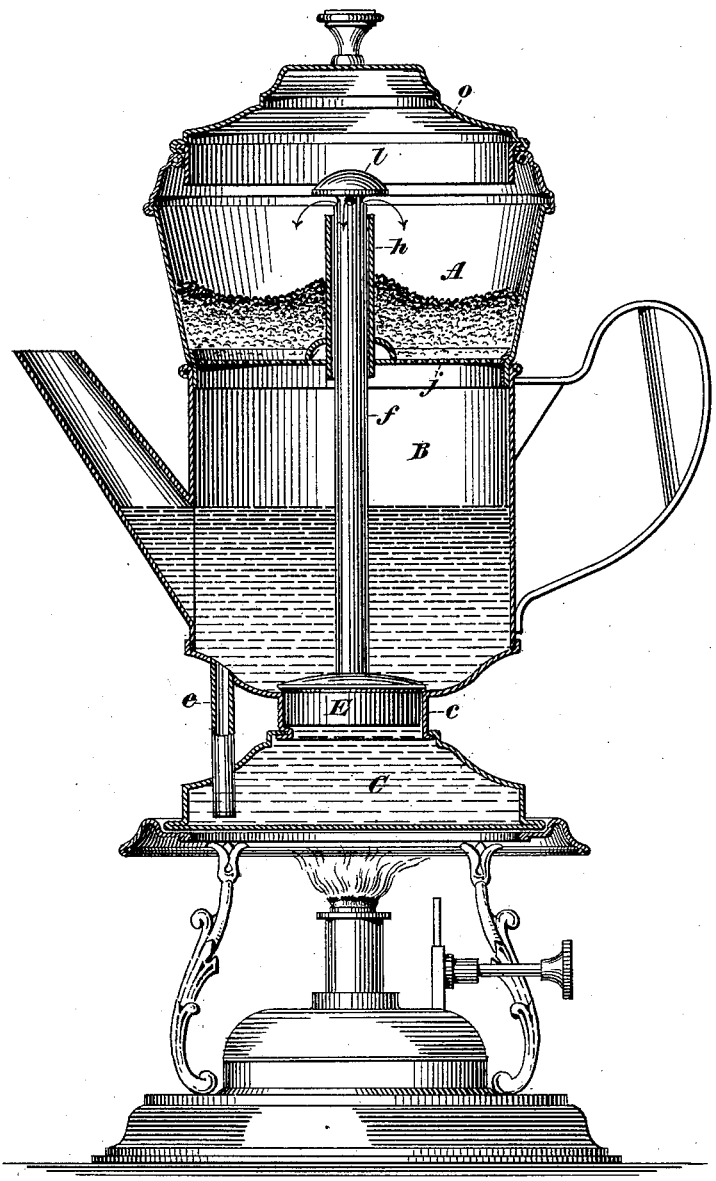

Figure 1 represents a vertical section of my urn on the line $c\,c$, Fig. 2. Fig. 2 represents a plan view of my improved urn with the cover removed. Fig. 3 is a plan view of the improved urn, the coffee-receptacle being removed. Fig. 4 represents a vertical section of a coffee-pot embodying my invention.

My improved urn consists of the following parts: a receptacle A, containing the grounds of coffee, having a cover $o$ and a perforated bottom $j$; below this a reservoir B, and below that a reservoir C, placed over a lamp or other heating device. From this reservoir or heating-chamber C a pipe $f$ extends upward to and into the coffee-receptacle A, said pipe being open at both ends and forming means of communication between the said receptacle A and the reservoir C. The lower end of this pipe is fitted into a weighted plug or stopper E, fitting into an annular recess $c$, said plug separating the reservoirs B and C. From the reservoir or heating-chamber C a pipe $e$, open at both ends, extends into the reservoir B, either through the plug E, as in Fig. 1, or, as shown in Fig. 4, extending from B to C outside of the plug E. The pipe $f$ within the receptacle A is embraced by a tube $h$, which projects upward from the perforated bottom $j$, a deflecting-cap $l$ being attached to the upper end of the tube $h$, Fig. 1, or tube $f$, Fig. 4. This tube $h$ is for the purpose of allowing the removal of the coffee-receptacle A without disturbing its contents. There is placed in this water-pipe $f$ a faucet $g$, provided with a stem extending to the outside of the urn and adapted to be operated without removing the same from the urn. The pipe $f$ near said faucet has a spout $p$ leading into the vessel B. When the faucet $g$ is in one position, it holds the pipe $f$ open and closes the spout $p$. In the other position it shuts off the upper part of the pipe $f$ and opens the spout $p$.

The operation of my invention is as follows: The two reservoirs B and C are first filled with the required amount of water, the level being indicated, if necessary, by any suitable gage $n$. Then the coffee-grounds are placed in the receptacle A and fire is applied to the lower reservoir or heating-chamber C. When sufficiently heated, the water from this reservoir or heating-chamber C rises in the tube $f$ and (the faucet being set to shut the spout $p$) flows over the top of said tube upon the coffee in the receptacle A, through which it percolates into the reservoir B as a solution or extract of coffee. The liquid circulates from this reservoir B into the reservoir C through the pipe $e$. This operation is continued until the extract or solution of coffee reaches the required strength, when it may be drawn off at the cock $m$. If it is desired to keep up the circulation of liquid and keep the coffee solution warm without at the same time passing any more liquid through the vessel A, the cock $g$ may be turned and the heated solution of coffee in the reservoir C forced to flow through the spout $p$ into the reservoir B, and not into the coffee-receptacle A. My improved urn may be placed in a cylindrical case or support G.

The faucet $g$ and spout $p$ may be dispensed with, as in Fig. 4.

The advantages of my invention are that I am enabled to quickly produce my solution of coffee without unnecessary waste of beans, and after the cock $g$ is shut off this solution of coffee may be kept at a certain temperature without gaining or losing any of its strength.

Therefore, having described my invention, what I claim is—

The combination, in a coffee pot or urn, of the heating-chamber C, reservoir B, and coffee-receptacle A, with the pipe $f$ extending from and furnishing a means of communication between the chamber C and the reservoir A, and having a cock $g$ and spout $p$ within the vessel B, and with the pipe $e$ extending from and furnishing a means of communication between said chamber C and reservoir B, substantially as herein described.

LOUIS MALEN.

Witnesses:
 R. J. PRESTON,
 GEORGE T. HATTON.